United States Patent [19]
Brunner et al.

[11] Patent Number: 5,541,978
[45] Date of Patent: Jul. 30, 1996

[54] METHOD AND SYSTEM FOR IMPLEMENTING A BACKUP DIGITAL CONTROL CHANNEL WITHIN A CELLULAR TELECOMMUNICATIONS NETWORK

[75] Inventors: Richard Brunner, Montreal; Daniel Dulong, Pincourt, both of Canada

[73] Assignee: Telefonaktiebolaget LM Ericsson, Stockholm, Sweden

[21] Appl. No.: 292,352

[22] Filed: Aug. 18, 1994

[51] Int. Cl.⁶ .................................................. H04D 7/30
[52] U.S. Cl. ............................................. 379/60; 370/95.1
[58] Field of Search .................................. 379/58, 59, 60, 379/63; 455/33.1, 33.2, 54.1, 34.1, 34.2, 54.2, 56.1; 370/95.1, 95.3

[56] References Cited

U.S. PATENT DOCUMENTS

| | | | |
|---|---|---|---|
| 4,817,089 | 3/1989 | Paneth et al. | 370/95 |
| 4,850,033 | 7/1989 | Eizenhöfer et al. | 455/56 |
| 5,008,953 | 4/1991 | Dahlin et al. | 455/33 |
| 5,119,031 | 6/1992 | Dahlin | 370/110.1 |
| 5,119,397 | 6/1992 | Dahlin et al. | 455/33 |
| 5,278,835 | 1/1994 | Ito et al. | 370/95.30 |

FOREIGN PATENT DOCUMENTS

| | | |
|---|---|---|
| 0550394 | 7/1993 | European Pat. Off. . |
| 0550394A2 | 7/1993 | European Pat. Off. . |
| 3125523 | 5/1991 | Japan . |
| 2247380 | 2/1992 | United Kingdom . |
| 9428644 | 12/1994 | WIPO . |

*Primary Examiner*—Curtis Kuntz
*Assistant Examiner*—Nay Aung Maung
*Attorney, Agent, or Firm*—Smith & Catlett, P.C.

[57] ABSTRACT

A system and method implements a backup digital control channel (DCCH) within a base station in a telecommunications network without relying on backup auto-tuners. When a DCCH fails, a backup DCCH is created by reconfiguring an available time slot in a different transmitter in the associated base station. All neighboring cells and neighboring outer cells are notified of the creation of the backup DCCH in the cell serviced by the base station, and update themselves accordingly.

22 Claims, 10 Drawing Sheets

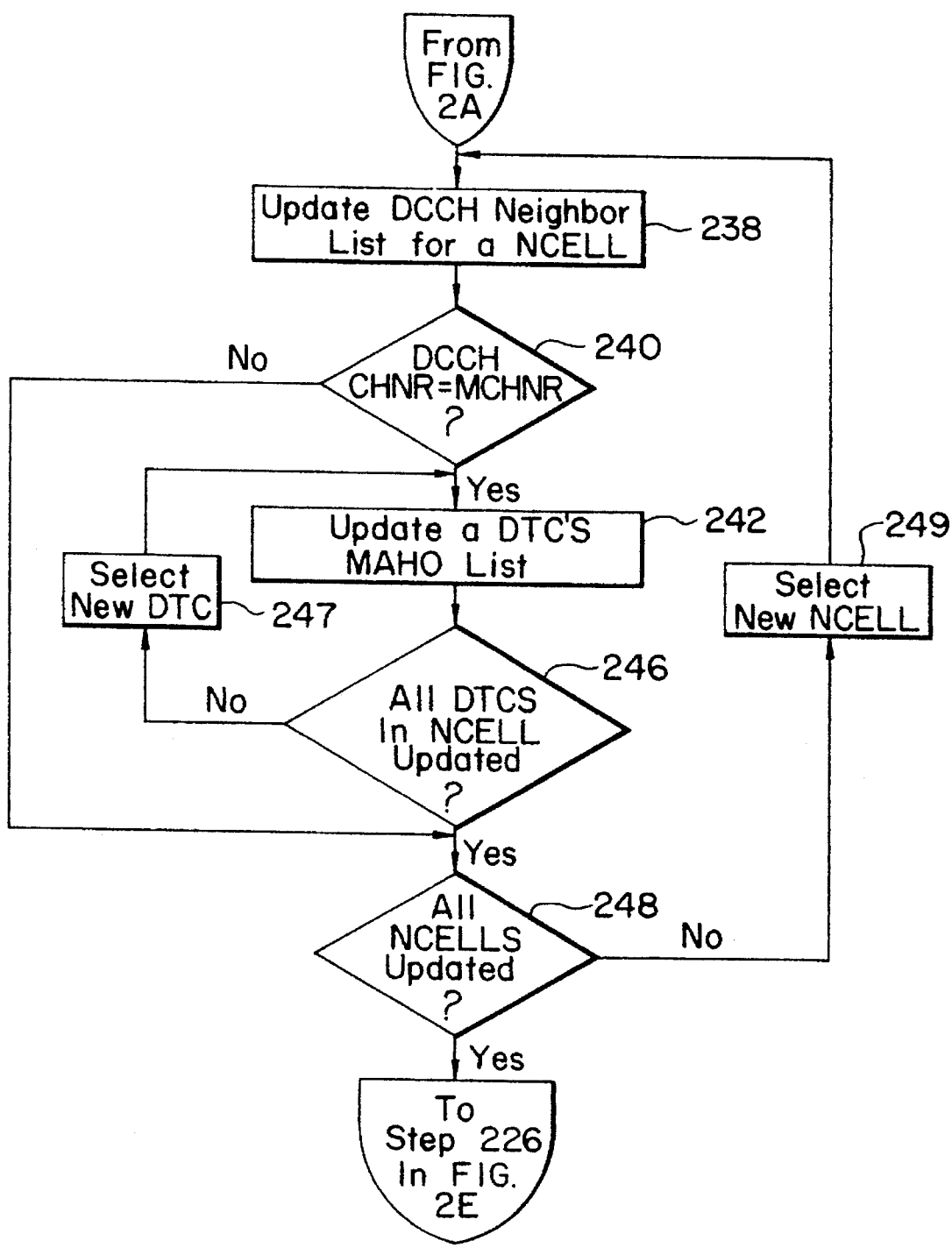

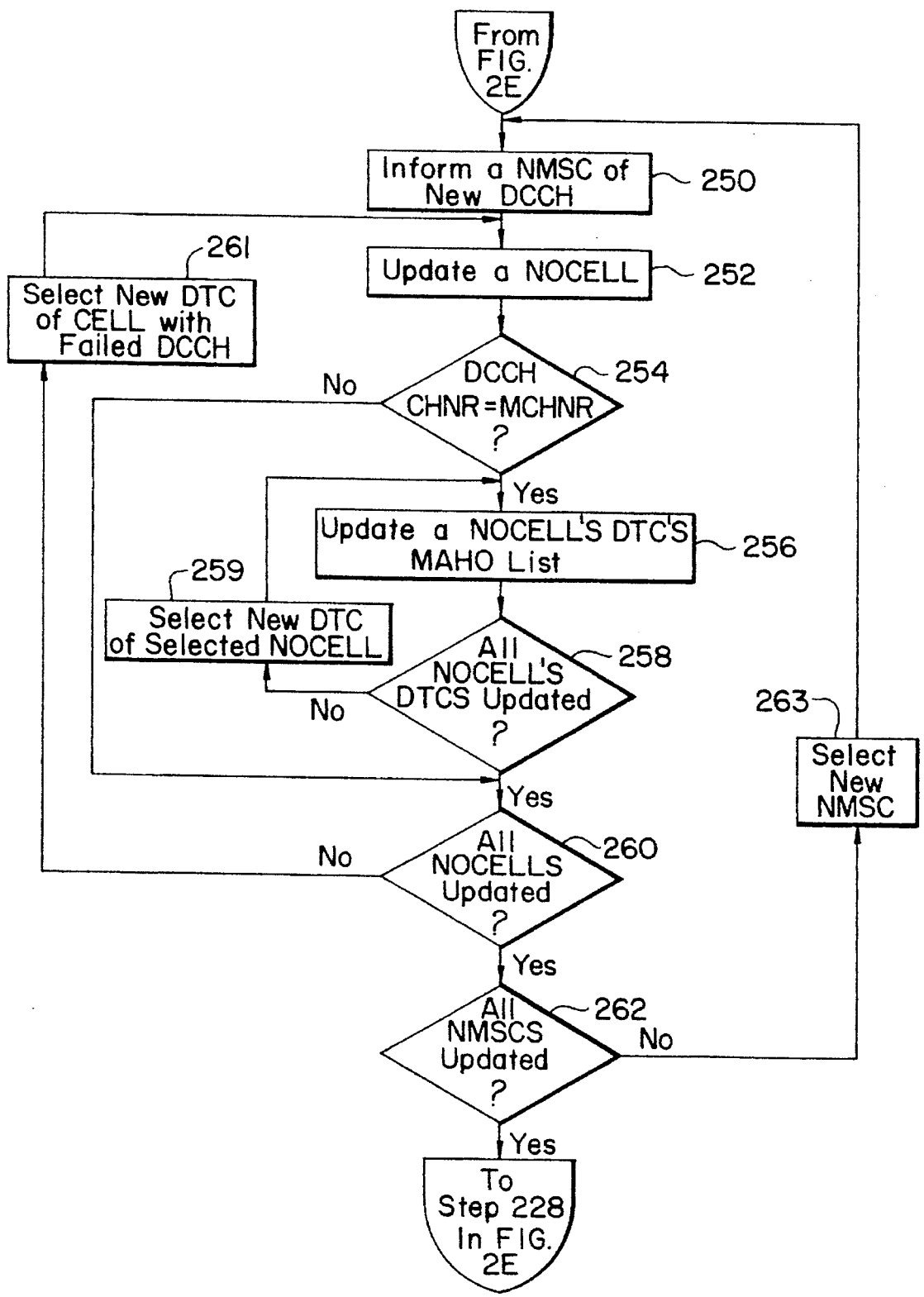

FIG.3A

| DESCRIPTION | LABEL | INTERWORK | SIGNAL |
|---|---|---|---|
| ACTIONS WITHIN CONTROLLING MSC<br><br>DCCH failure.<br><br>IF  more digital equipment in cell<br>THEN<br>  BEGIN<br>    IF no available time slot<br>    THEN free one.<br><br>    Select first available time<br>    slot<br>  END<br>ELSE<br>  exit.<br>Configure selected time slot as<br>DCCH.<br><br>IF cell contains FSK CC THEN<br>BEGIN<br>  Update Digital Control Channel<br>  Information Message<br>  (see PN3011-2, 3.7.1.2.5)<br>END | | CELL_Neighbour_Cell     MSC<br><br>←─── 302<br><br><br><br><br><br>───→ 304<br>───→ 306<br>───→ 308 | <br><br><br><br><br><br><br><br><br><br>MDEQDATA<br>MDCCHDATA<br>DPMCCDATA |

FIG.3B

| DESCRIPTION | LABEL | INTERWORK | SIGNAL |
|---|---|---|---|
| IF cell contains DTC's THEN<br>BEGIN<br>  FOR ALL DTC's in cell<br>  Update Coded Digital Locator<br>  and Digital Control Channel<br>  Information for Release<br>  (see PN3011-2, 3.7.1.2.5 and<br>  3.7.3.1.3.2.6)<br>  NEXT<br>END | | CELL   MSC<br>Neighbour_Cell<br>     ↓ 310 | MDVCDATA |
| IF cell contains AVC's THEN<br>BEGIN<br>  FOR ALL AVC's in cell<br>  Update DCC CHNR and DVCC used<br>  for Digital Control Channel<br>  Information Word<br>  (see PN3011-2, 3.7.2)<br>  NEXT<br>END | |      ↓ 312 | DPMVCDATA |

FIG. 3D

| DESCRIPTION | LABEL | INTERWORK | | | SIGNAL |
|---|---|---|---|---|---|
| | | MSC | Neighbor_MSC | NOCELL | |
| ACTIONS IN NEIGHBOURING MSC'S | | | | | |
| IF cell has NOCELLS THEN<br>BEGIN<br>  FOR ALL neighbor MSC's<br>  Inform MSC of changed DCCH<br>  service acces point. | | 318 →  | | | DCC_SAP_CHANGE |
| FOR ALL neighbor outer cells<br>  Update DCCH neighbor list<br>  with new CHNR and DVCC. | | | 320 → | | DCCHDATA |
| IF failed DCCH CHNR is a<br>  MCHNR for MAHO THEN<br>BEGIN<br>  FOR ALL DTC's in cell<br>  Update MAHO list<br>  (see PN3011-2,<br>  3.7.1.2.5)<br>    NEXT<br>  END<br>  NEXT<br>END | | | 322 → | | DVCDATA |

METHOD AND SYSTEM FOR IMPLEMENTING A BACKUP DIGITAL CONTROL CHANNEL WITHIN A CELLULAR TELECOMMUNICATIONS NETWORK

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND

1. Technical Field of the Invention

The present invention relates to a cellular telecommunication network, and more particularly, to a backup to the network's digital control channel.

2. Description of Related Art

In modern cellular telecommunication networks, the networks are divided into cells which service a defined area for mobile stations. Each cell contains a base station which transmits and receives voice and control information to and from mobile stations which are located within the cell's coverage area. Each of the cells employs a separate control channel for relaying control information to mobile stations. Currently, cellular telecommunications networks utilize analog control channels for the passing of control information.

Analog technology, however, limits the total number of channels available within the mobile frequency spectrum to 832, approximately 21 of which may be used as control channels. Analog technology also limits the allocation of a subscriber communications or control channel to a single analog radio channel. Digital technology has been introduced to solve many of the limitations and problems associated with analog technology, therefore, the cellular telecommunication industry (hereinafter referred to as the cellular industry) is rapidly moving toward finalizing a standard for a Digital Control Channel (DCCH) which has total frequency agility over the entire mobile telephone frequency spectrum.

In digital cellular networks, a plurality of subscriber voice channels or control channels can be assigned to each radio frequency through Time Division Multiple Access (TDMA) technology. In TDMA technology, each channel which is broadcasting at a particular frequency is divided into a plurality of time slots. Subscriber communications or control channel signals are converted to digital format and divided into short communications bursts. Each burst is tagged with an identifier, assigned a time slot, and is broadcast in an interleaved fashion with other bursts on the same frequency. At the receiving end, the identifiers are used to reconstruct the entire communication from the individual bursts.

The current version of the cellular industry standard for a Digital Control Channel (DCCH) is described in Project No. 3011-2 of the EIA/TIA Interim Standard IS-54-C, "Cellular System Dual-Mode Mobile Station—Base Station Compatibility Standard", dated Apr. 8, 1994, which is hereby incorporated by reference herein. As noted above, the DCCH provides total frequency agility over the entire mobile telephone frequency spectrum and thereby greatly increases the number of available control channels. The DCCH transmits control information to mobile stations along with information about neighboring cells (NCELLS).

The DCCH performs the function of a service access point for mobile subscribers to cells within a cellular telecommunications network. Thus, if a DCCH fails, the services provided by the cell are lost, resulting in decreased revenues for the network operator.

In cellular telecommunication networks, mobile calls must be processed on a continuous basis. Therefore, it is critical to have base stations operating on a continuous basis. If a DCCH is implemented on a base station's transmitter, and that transmitter subsequently fails, then all mobile stations within the base station's cell are no longer able to establish new communications with the base station. Therefore, it is desirable for base stations to have a backup control channel to ensure that a high service level is maintained in the associated cell.

Currently, the cellular industry uses a hardware solution to provide a backup for a failed primary DCCH. The hardware solution may be, for example, a conventional configuration of frequency agile transmitter combiners, hereinafter referred to as an auto-tuner. Typically, the auto-tuner is physically connected to the failed transmitter on which the primary DCCH was employed. Once the failure of the transmitter is detected, all DCCH operations within the transmitter are physically transferred to the auto-tuner via a hardware switch.

There are several disadvantages in using an auto-tuner for performing the DCCH backup function. First, each base station desiring a backup for its DCCH must be physically retro-fitted with an auto-tuner. Second, any changes or revisions to the logic for the auto-tuner requires changing the internal components of the hardware for each such auto-tuner. Finally, any changes or revisions to the hardware of an auto-tuner often requires service personal to physically visit each base station having an auto-tuner in order to make the revisions or changes. This is an expensive and wasteful solution.

It would be a distinct advantage to have a backup DCCH which overcomes these disadvantages. The present invention provides such a solution.

SUMMARY OF THE INVENTION

The present invention is a computer program for performing the backup function of a Digital Control Channel (DCCH). If the DCCH fails, then the computer program finds any available time slot on any transceiver within the base station, and reconfigures the time slot to implement a backup DCCH. Any required updates to the computer program may be performed remotely via a mobile switching center (MSC) associated with the appropriate base station.

In one aspect, the present invention is a method of implementing a backup digital control channel within a cellular telecommunications network having a plurality of cells, with each of the cells having an associated base station, each of the base stations having a plurality of transmitters, and one of the transmitters in each one of the base stations transmitting a digital control channel.

The method of the present invention includes detecting a failure of a primary digital control channel within one of the base stations, and identifying a first transmitter of the plurality of transmitters in the base station with the failed digital control channel, which has the failed digital control channel. Next, an available time slot is detected in a second transmitter of the plurality of transmitters in the base station with the failed digital control channel, and the available time slot is reconfigured as the backup digital control channel to replace the failed digital control channel. Neighbor cells and neighbor outer cells are then informed that the backup digital control channel has replaced the failed digital control channel.

In another aspect, the present invention is a system for implementing a backup digital control channel within a cellular telecommunications network comprising means for detecting a failure of a primary digital control channel within one of the base stations, and means for identifying a first transmitter of the plurality of transmitters in the base station with the failed digital control channel, which has the failed digital control channel. The system also includes means for detecting an available time slot in a second transmitter of the plurality of transmitters in the base station with the failed digital control channel, and means for reconfiguring the available time slot as the backup digital control channel to replace the failed digital control channel. The system also includes means for informing neighbor cells and neighbor outer cells that the backup digital control channel has replaced the failed digital control channel.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIGS. 2A–2F are a flow chart illustrating the steps of a computer program for implementing a software Digital Control Channel (DCCH) backup function for a failed primary DCCH within one of the cells C1–C10 of FIG. 1; and FIGS. 3A–3D are a sequence diagram illustrating the signals and pseudo code for implementing a preferred embodiment of the DCCH backup function of FIGS. 2A–2F.

DETAILED DESCRIPTION OF EMBODIMENTS

Figure 1:
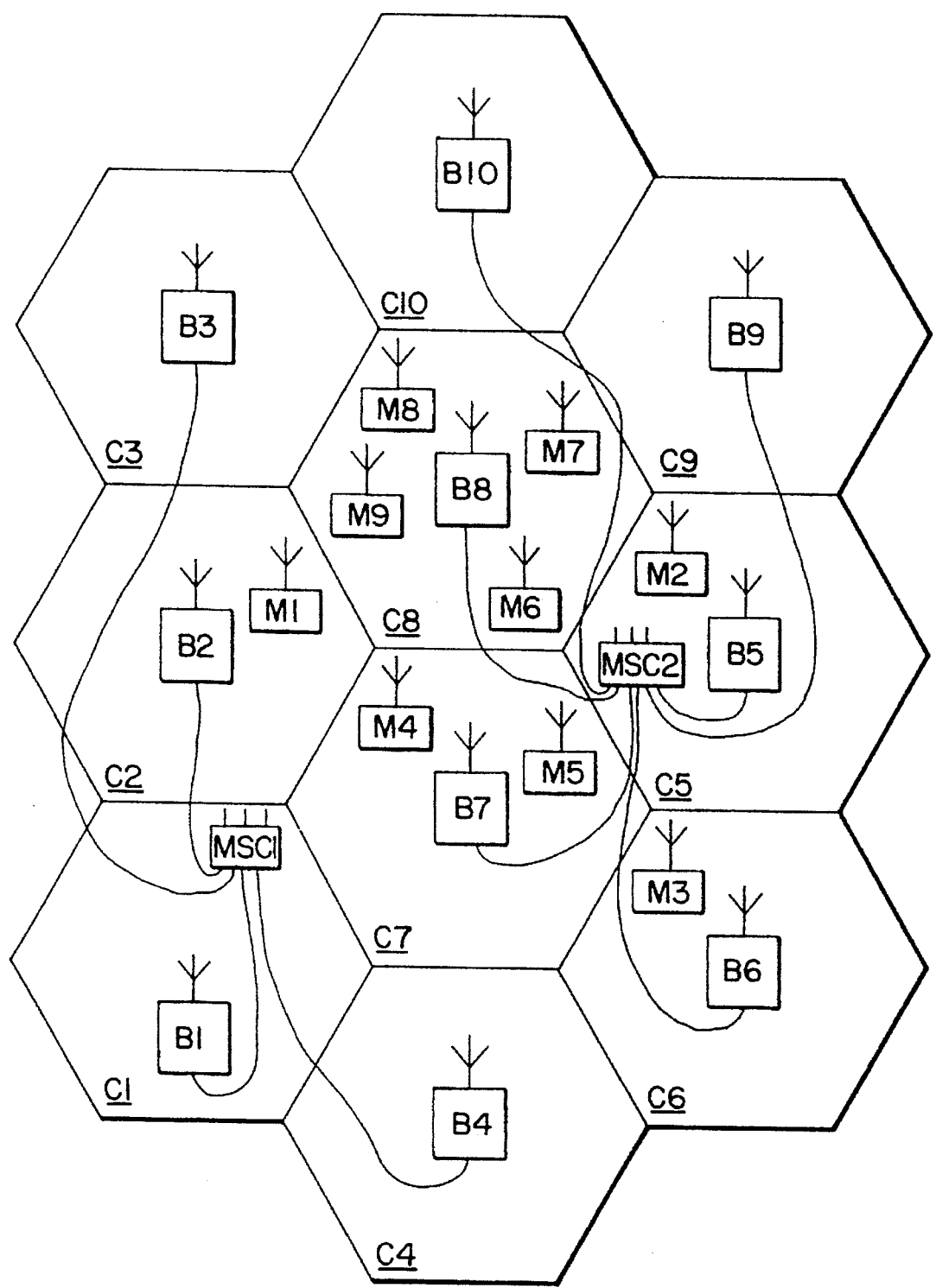
FIG. 1 is a diagram of a conventional cellular radio communications system of the type to which the present invention generally pertains.

Referring first to FIG. 1, there is illustrated a conventional cellular radio communications system of the type to which the present invention generally pertains. In FIG. 1, an arbitrary geographic area may be divided into a plurality of contiguous radio coverage areas, or cells C1–C10. While the system of FIG. 1 is illustratively shown to include only 10 cells, it should be clearly understood that in practice, the number of cells will be much larger.

Associated with and located within each of the cells C1–C10 is a base station designated as a corresponding one of a plurality of base stations B1–B10. Each one of the base stations B1–B10 includes a transmitter, a receiver, and base station controller as are well known in the art. In FIG. 1, the base stations B1–B10 are illustratively located at the center of each of the cells C1–C10, respectively, and are equipped with omni-directional antennas. However, in other configurations of a cellular radio system, the base stations B1–B10 may be located near the periphery, or otherwise away from the centers of the cells C1–C10 and may illuminate the cells C1–C10 with radio signals either omni-directionally or directionally. Therefore, the representation of the cellular radio system of FIG. 1 is for purposes of illustration only and is not intended as a limitation on the possible implementations of the cellular radio system within which the method and system of the present invention may be implemented.

With continuing reference to FIG. 1, a plurality of mobile stations M1–M10 may be found within the cells C1–C10. Again, only 10 mobile stations are shown in FIG. 1 but it should be understood that the actual number of mobile stations will be much larger in practice and will invariably greatly exceed the number of base stations. Moreover, while none of the mobile stations M1–M10 may be found in some of the cells C1–C10, the presence or absence of the mobile stations M1–M10 in any particular one of the cells C1–C10 should be understood to depend, in practice on the individual desires of the mobile stations M1–M10 who may roam from one location in the cell to another or from one cell to an adjacent cell or neighboring cell, and even from one cellular radio system served by a mobile switching center to another such system.

Each of the mobile stations M1–M10 is capable of initiating or receiving a telephone call through one or more of the base stations B1–B10 and an associated mobile switching center (MSC). A mobile switching center MSC1 is connected by communication links, e.g., cables, to each of the illustrative base stations B1–B4 and to a fixed public switched telephone network (PSTN) (not shown) or a similar fixed network which may include an integrated system digital network (ISDN) facility. A mobile switching center MSC2 is connected by communication links, e.g., cables, to each of the illustrative base stations B5–B10 and to the fixed public switched telephone network (PSTN) (not shown) or a similar fixed network which may include an integrated system digital network (ISDN) facility. The relevant connections between the mobile switching center MSC1 and MSC2, and between mobile switching centers MSC1 and MSC2 and the PSTN or ISDN, are not completely shown in FIG. 1 but are well known to those of ordinary skill in the art.

Each of the cells C1–C10 is allocated a plurality of voice or speech channels and at least one access or control channel. The control channel is used to control or supervise the operation of mobile stations by means of information transmitted to and received from those units. Such information may include incoming call signals, outgoing call signals, page signals, page response signals, location registration signals, voice channel assignments, maintenance instructions, and cell reselection instructions as a mobile station travels out of the radio coverage of one cell and into the radio coverage of another cell. The control or voice channels may operate either in an analog or digital mode or a combination thereof.

Figure 2A:
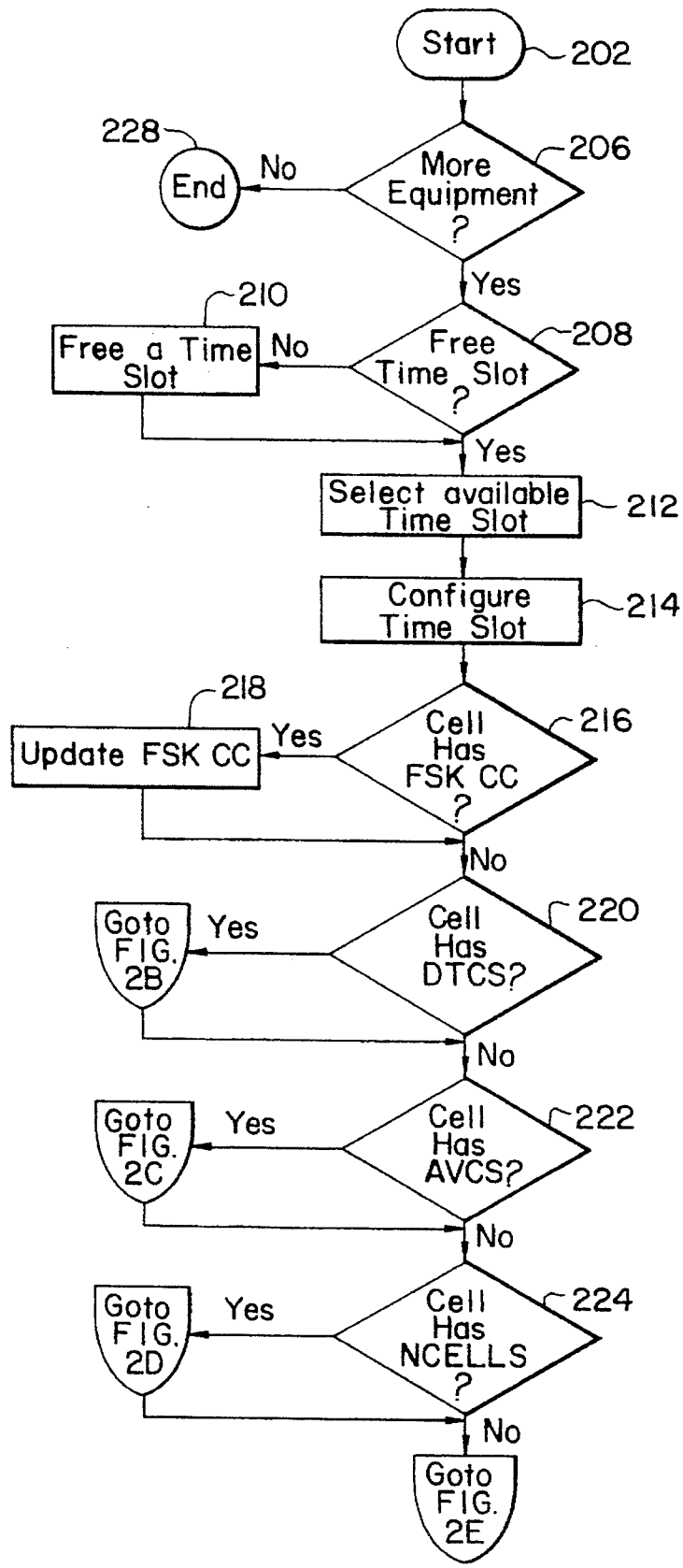

FIGS. 2A–2F show a flow chart illustrating the steps of a computer program for implementing a software Digital Control Channel (DCCH) backup function for a failed primary DCCH within one of the cells C1–C10 of FIG. 1. Referring now to FIG. 2A, the program begins at step 202 and proceeds to step 206 upon the detection of a DCCH failure within a base station of one of the cells C1–C10 (FIG. 1). Once the DCCH failure has been detected, the program determines whether or not more digital equipment is available within the associated base station of the cell with the failed DCCH. If there is not any digital equipment available, the program ends at step 228. If, however, at step 206 it is determined that more digital equipment is available, then the program selects the available equipment and proceeds to step 208.

At step 208, the program determines whether or not a free time slot is available within any of the channels on the selected equipment. If it is determined that a free time slot is not available, then the program proceeds to step 210 where a time slot within a specified channel is made available. The program then moves to step 212 where the program selects the available time slot. If, however, at step 208 it is determined that a free time slot is available, then the program proceeds directly to step 212 where the program selects the available time slot. The program then proceeds to step 214 where the selected time slot is reconfigured as a new DCCH.

The program then proceeds to step 216 where it is determined whether or not the base station of the cell with the failed DCCH contains a frequency shift key (FSK) analog control channel. If it is determined that the base station contains an FSK control channel, then the program proceeds to step 218 where the FSK is updated with a channel number and a digital verification color code of the new DCCH. The program then moves to step 220. If, however, at step 216 it is determined that the base station does not contain an FSK control channel, then the program proceeds directly to step 220. At step 220 it is determined whether or not the base station contains digital traffic channels (DTCs). If it is determined that the base station contains DTCs, then the program proceeds to step 230 in FIG. 2B. If, at step 220 it is determined that the failing cell does not contain DTCs, then the program proceeds to step 222.

Figure 2E:
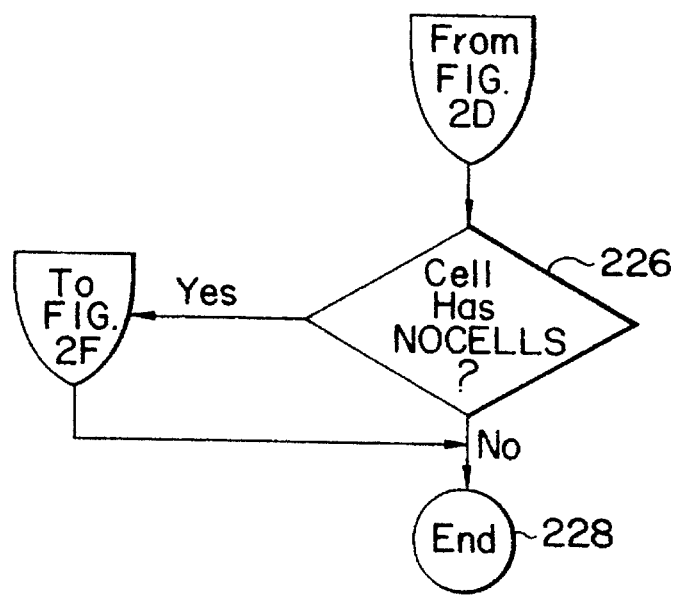
Figure 2B:
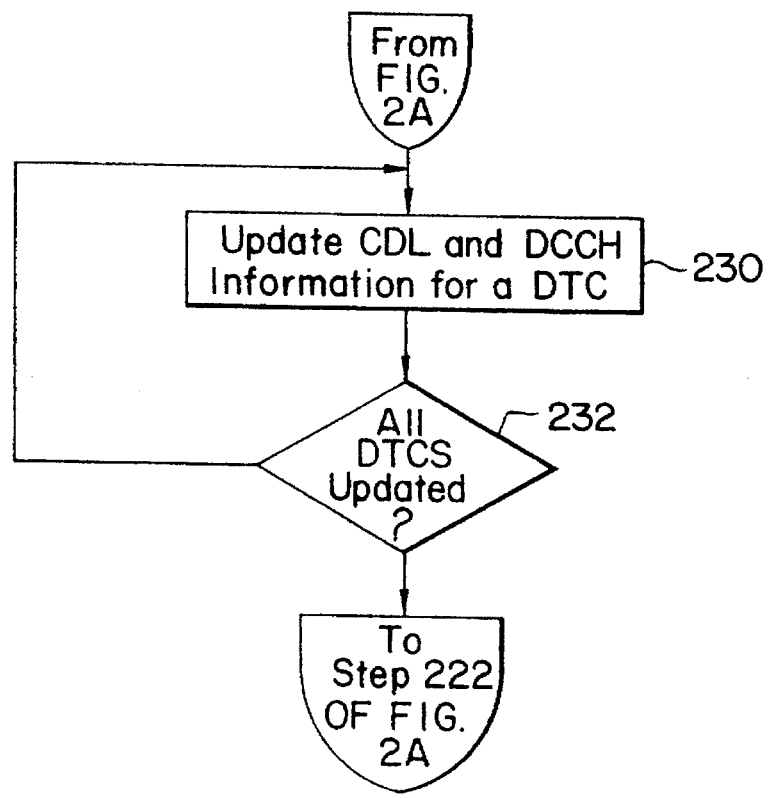

Referring now to FIG. 2B, at step 230 a selected DTC is updated with the channel number and digital verification color code (DVCC) of the new DCCH, as well as a coded digital locator (CDL) of the DTC. The program then proceeds to step 232 where it is determined whether or not all DTCs within the base station have been updated. If it is determined that all the DTCs within the cell have not been updated, then the program selects a new DTC and returns to step 230 where it repeats the updating process. If, at step 232 it is determined that all DTCs within the base station have been updated, then the program proceeds to step 222 in FIG. 2A.

Referring again to FIG. 2A, at step 222, the program determines whether or not the base station contains analog voice channels (AVCs). If it is determined that the base station contains analog voice channels, then the program proceeds to step 234 in FIG. 2C. If, however, at step 222 it is determined that the base station does not contain AVCs, then the program proceeds to step 224.

Figure 2C:
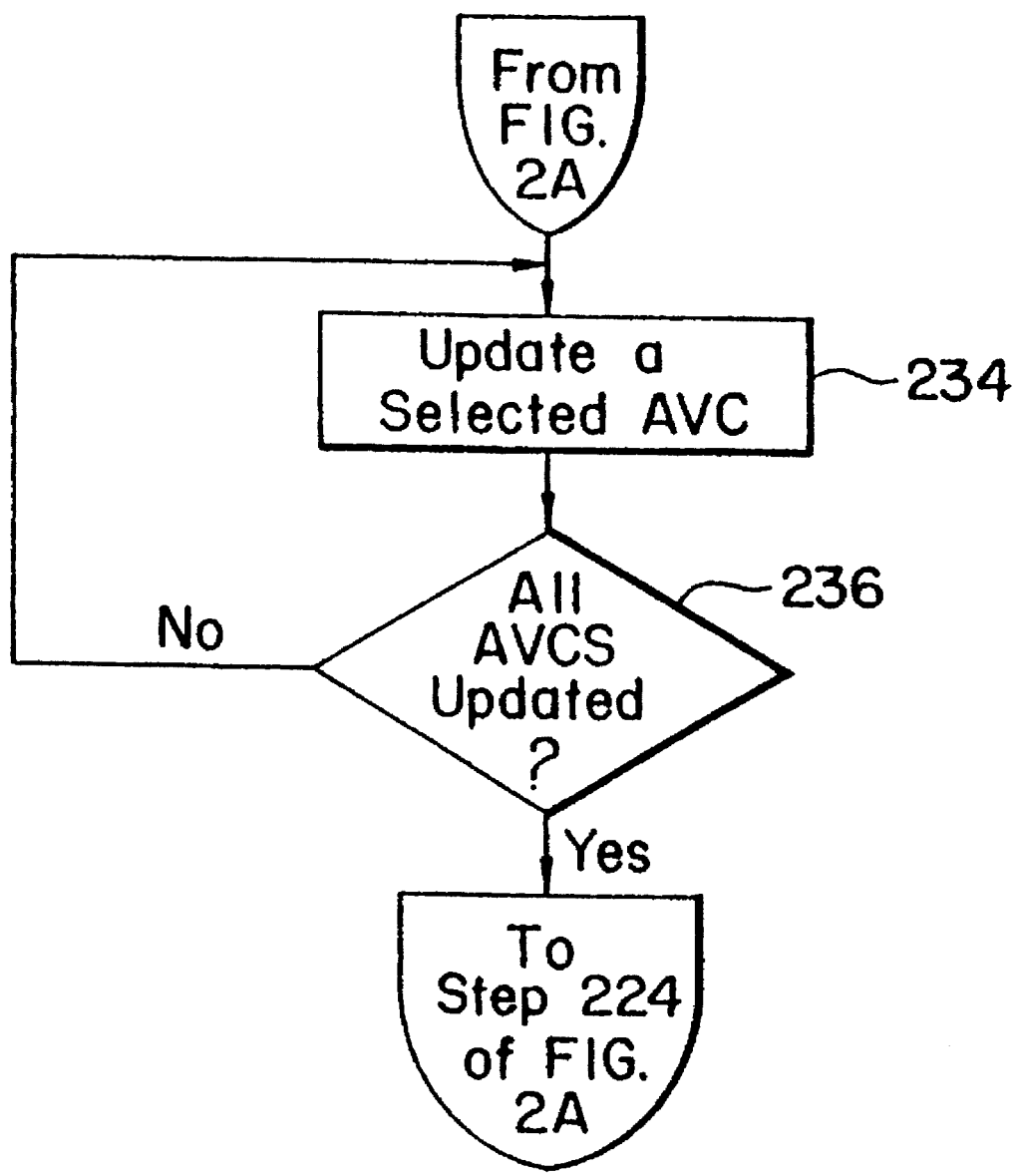

Referring now to FIG. 2C, at step 234 a selected AVC is updated with the channel number and digital verification color code (DVCC) of the new DCCH. The program then proceeds to step 236 where it is determined whether or not all AVCs within the base station have been updated. If it is determined that all AVCs within the base station have not been updated, then the program selects a new AVC, returns to step 234, and repeats the updating process. If it is determined at step 236 that all AVCs within the base station have been updated, then the program proceeds to step 224 in FIG. 2A.

Referring again to FIG. 2A, at step 224 it is determined whether or not the cell serviced by the base station with the failed DCCH has any neighboring cells (NCELLS). If the cell has NCELLS, then the program proceeds to step 238 in FIG. 2D. If the cell does not have NCELLS, then the program proceeds to step 226 in FIG. 2E.

Referring now to FIG. 2D, at step 238, the DCCH neighbor list for a selected NCELL is updated with the channel number and DVCC of the new DCCH, and the program proceeds to step 240. At step 240, it is determined whether or not the DCCH channel number is a Measurement Channel Number (MCHNR) for a Mobile Assisted Handoff (MAHO), as defined in the IS-54 standard. If it is determined that the DCCH channel number is a MCHNR for a MAHO, then the program proceeds to step 242. If, however, it is determined at step 240 that the DCCH channel number is not a MCHNR for a MAHO, then the program proceeds to step 248. At step 242, a selected DTCs MAHO list is updated, and the program proceeds to step 246 where it is determined whether or not all DTCs within the selected NCELL cell have been updated. If it is determined that all DTCs within the selected NCELL cell have been updated, then the program proceeds to step 248. If it is determined at step 246 that all DTCs within the selected NCELL cell have not been updated, then the program selects a new DTC at 247, returns to step 242, and repeats the updating process. At step 248, it is determined whether or not all NCELLS have been updated. If it is determined that all NCELLS are not updated, then the program selects a new NCELL at 249, returns to step 238, and repeats the process previously described in connection with step 238. If it is determined at step 248 that all NCELLS have been updated, then the program proceeds to step 226 in FIG. 2E.

Referring now to FIG. 2E, at step 226 it is determined whether or not the cell serviced by the base station with the failed DCCH has neighboring outer cells (NOCELLS). A NOCELL is defined as a neighboring cell which is controlled by a different MSC than the cell with the failed DCCH. In FIG. 1, for example, C7 is a NOCELL to C1 because C7 is a neighboring cell which is controlled by MSC2 while C1 is controlled by MSC1. If it is determined that the cell has NOCELLS, then the program proceeds to step 250 in FIG. 2F. If it is determined at step 226 that the cell does not have NOCELLS, then the program ends at step 228.

Referring now to FIG. 2F, at step 250 a selected neighboring mobile switching center (NMSC) is informed of the new DCCH service access point, and the program proceeds to step 252 where a selected NOCELL has its DCCH neighbor list updated with the channel number and DVCC of the new DCCH. The program then proceeds to step 254 where it is determined whether or not the channel number of the new DCCH is a Measurement Channel Number (MCHNR) for a Mobile Assisted Handoff (MAHO). If it is determined that the channel number of the new DCCH is a MCHNR for a MAHO, then the program proceeds to step 256. If, however, it is determined at step 254 that the channel number of the new DCCH is not a MCHNR for a MAHO, then the program proceeds to step 260. At step 256, the selected NOCELL's DTCs MAHO list is updated, and the program proceeds to step 258. At step 258, it is determined whether or not all the selected NOCELL's DTCs have been updated. If all the selected NOCELL's DTCs have not been updated, then the program selects a new DTC of the selected NOCELL at 259, returns to step 256, and repeats the updating process. If it is determined at step 258 that all NOCELL's DTCs have been updated, then the program proceeds to step 260 where it is determined whether or not all NOCELLs have been updated. If all NOCELLS are not updated, then the program selects a new NOCELL of the cell with the failed DCCH at 261, returns to step 252, and repeats the process previously described in connection with step 252. If it is determined at step 260 that all NOCELLS have been updated, then the program proceeds to step 262 where it is determined whether or not all NMSCs have been updated. If all NMSCs are not updated, then the program selects a new NMSC at 263, returns to step 250, and repeats the process previously described in connection with step 250. If it is determined at step 262 that all NMSCs have been updated, then the program returns to FIG. 2E and ends at step 228.

Figure 3C:
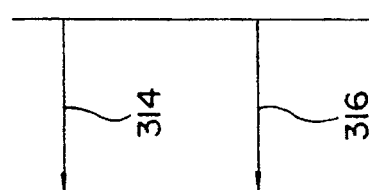

FIGS. 3A–3D show a sequence diagram illustrating the signals and pseudo code for implementing a preferred embodiment of the DCCH backup function of FIGS. 2A–2F. In particular, FIGS. 3A–3C illustrate actions taken within a controlling MSC upon detection of a DCCH failure. FIG. 3D illustrates actions taken within neighboring MSCs. Referring first to FIG. 3A, upon the determination that a DCCH failure has occurred within a base station, a signal is sent to the base station's controlling MSC at 302. The controlling MSC performs the steps 206–214 as previously described in connection with FIGS. 2A–2F. At 304, the controlling MSC sends a MDEQDATA signal to the base station which indicates that the selected time slot is to be reconfigured as the new DCCH. At 306, the controlling MSC sends a MDCCHDATA signal and a DPMCCDATA signal to the base station with the DCCH failure. The base station responds to the two signals as previously described in connection with steps 216–218 of FIG. 2A.

Referring now to FIG. 3B, at 310 the controlling MSC sends a MDVCDATA signal to the base station with the DCCH failure. The base station responds to the signal as previously described in connection with step 230 of FIG. 2B and steps 230–232 of FIG. 2B. At 312, the controlling MSC sends a DPMVCDATA signal to the base station. The base station responds to the signal as previously described in connection with step 222 of FIG. 2A and steps 234–236 of FIG. 2D.

Referring now to FIG. 3C, at 314 the controlling MSC sends a MDCCHDATA signal to each neighbor cell associated with the base station with the DCCH failure. Each neighbor cell responds to the signal as previously described in step 224 of FIG. 2A and steps 238–248 of FIG. 2D. At 316, the controlling MSC sends a MDVCDATA signal to each neighbor cell associated with the base station with the DCCH failure. Each neighbor cell responds to the signal as previously described in step 224 of FIG. 2A and steps 238–248 of FIG. 2D.

Referring now to FIG. 3D, at 318, the controlling MSC sends a DCC_SAP_CHANGE signal to each neighbor MSC of the NOCELLS. A neighboring MSC responds, at 320, by sending a DCCHDATA signal and a DCDATA signal to each of the neighboring outer cells. The neighbor MSC and the associated neighboring outer cells respond to the signals as previously described in connection with step 226 of FIG. 2E and steps 250–264 of FIG. 2F.

The flow charts of FIGS. 2A–2F as well as the sequence diagrams of FIGS. 3A–3D are functional whether the cellular telecommunications network is implemented under the IS-54 standard, the Global Standard for Mobile Communications (GSM), or the Japanese standard (PDC). The process is essentially the same for GSM or PDC; IS-54 adds specific steps which deal with frequency shift key analog control channels (FSK CCs) and analog voice channels (AVCs). At decision steps which involve these IS-54-specific implementations, the process determines whether or not the base station of the cell with the failed DCCH contains a FSK CC or AVCs. If it does, then the program updates those IS-54 implementations. If not, the program continues with steps that are common to all three standards.

It is thus believed that the operation and construction of the present invention will be apparent from the foregoing description. While the method shown and described has been characterized as being preferred, it will be readily apparent that various changes and modifications could be made therein without departing from the spirit and scope of the invention as defined in the following claims.

What is claimed is:

1. A method of implementing a backup digital control channel within a cellular telecommunications network having a plurality of cells, each of said cells having an associated base station, each of said base stations being controlled by a mobile switching center, each of said base stations having a plurality of transmitters, and one of said transmitters in each one of said base stations transmitting a digital control channel, said method comprising the steps of:

detecting by one of said base stations a failure of said digital control channel therein;

identifying by said base station with said failed digital control channel a first transmitter of said plurality of transmitters, said first transmitter having the failed digital control channel;

detecting at the mobile switching center an available time slot in a second transmitter of said plurality of transmitters in said base station with said failed digital control channel;

reconfiguring from the mobile switching center said available time slot as said backup digital control channel to replace said failed digital control channel;

informing by the mobile switching center a neighbor cell that said backup digital control channel has replaced said failed digital control channel; and informing by the mobile switching center through an exchange a neighbor outer cell controlled by a neighboring mobile switching center that said backup digital control channel has replaced said failed digital control channel.

2. The method of claim 1 further comprising the step of:

updating by the mobile switching center a frequency shift keying control channel within the base station having said detected failed digital control channel, with a digital verification color code and a channel number of said backup digital control channel.

3. The method of claim 2 further comprising the step of:

updating by the mobile switching center a digital traffic channel within the base station having said failed digital control channel, with said digital verification color code and said channel number of said backup digital control channel.

4. The method of claim 3 further comprising the step of:

updating by the mobile switching center a digital traffic channel within the base station having said failed digital control channel, with a coded digital locator of said backup digital control channel.

5. The method of claim 4 further comprising the step of:

updating by the mobile switching center an analog voice channel within the base station having said failed digital control channel with said digital verification color code and said channel number of said backup digital control channel.

6. The method of claim 1 wherein said step of informing a neighbor cell includes the step of:

updating by the mobile switching center a digital control channel neighbor list of said neighbor cell with a channel number and a digital verification color code of said backup digital control channel.

7. The method of claim 6 wherein said step of informing a neighbor cell includes the step of informing by the mobile switching center a neighbor cell which includes a digital traffic channel having a mobile assisted handoff list.

8. The method of claim 7 wherein said step of updating a digital control channel neighbor list of said neighbor cell includes the step of updating by the mobile switching center said mobile assisted handoff list of said digital traffic channel with said backup digital control channel.

9. The method of claim 1 wherein said step of informing a neighbor outer cell includes the steps of:

informing by the mobile switching center the neighboring mobile switching center having control over said neighbor outer cell that said backup digital control channel has replaced said failed digital control channel; and updating by the neighboring mobile switching center a digital control channel list of said neighbor outer cell with a channel number and a digital verification color code of said backup digital control channel.

10. The method of claim 9 wherein said step of informing a neighbor outer cell includes the step of informing by the neighboring mobile switching center a neighbor outer cell which includes a digital traffic channel having a mobile assisted handoff list.

11. The method of claim 10 wherein said step of updating a digital control channel list of said neighbor cell includes the step of updating by the neighboring mobile switching center said mobile assisted handoff list of said digital traffic channel with said backup digital control channel.

12. A system for implementing a backup digital control channel within a cellular telecommunications network having a plurality of cells, each of said cells having an associated base station, each of said base stations having a plurality of transmitters, and one of said transmitters in each one of said base stations transmitting a digital control channel, said system comprising:

means for detecting a failure of said digital control channel within one of said base stations;

means for identifying a first transmitter of said plurality of transmitters in said base station with said failed digital control channel, said first transmitter having the failed digital control channel;

means for detecting an available time slot in a second transmitter of said plurality of transmitters in said base station with said failed digital control channel;

means for reconfiguring said available time slot as said backup digital control channel to replace said failed digital control channel;

means for informing a neighbor cell that said backup digital control channel has replaced said failed digital control channel; and means for informing a neighbor outer cell controlled by a neighboring mobile switching center that said backup digital control channel has replaced said failed digital control channel.

13. The system of claim 12 further comprising:

means for updating a frequency shift key control channel within the base station having said detected failed digital control channel, with a digital verification color code and a channel number of said backup digital control channel.

14. The system of claim 12 further comprising:

means for updating a digital traffic channel within the base station having said failed digital control channel, with said digital verification color code and said channel number of said backup digital control channel.

15. The system of claim 14 further comprising:

means for updating a digital traffic channel within the base station having said failed digital control channel, with a coded digital locator of said backup digital control channel.

16. The system of claim 15 further comprising:

means for updating an analog voice channel within the base station having said failed digital control channel with said digital verification color code and said channel number of s aid backup digital control channel.

17. The system of claim 12 wherein said means for informing a neighbor cell includes:

means for updating a digital control channel neighbor list of said neighbor cell with a channel number and a digital verification color code of said backup digital control channel.

18. The system of claim 17 wherein said neighbor cell includes a digital traffic channel having a mobile assisted handoff list.

19. The system of claim 18 wherein said means for updating a digital control channel neighbor list of said neighbor cell includes:

means for updating said mobile assisted handoff list of said digital traffic channel of said neighbor cell with said backup digital control channel.

20. The system of claim 12 wherein said means for informing a neighbor outer cell includes:

means for informing a neighboring mobile switching center having control over said neighbor outer cell that said backup digital control channel has replaced said failed digital control channel; and means for updating a digital control channel list of said neighbor outer cell with a channel number and a digital verification color code of said backup digital control channel.

21. The system of claim 20 wherein said neighbor outer cell includes a digital traffic channel having a mobile assisted handoff list.

22. The system of claim 21 wherein said means for updating a digital control channel list of said neighbor outer cell includes:

means for updating said mobile assisted handoff list of said digital traffic channel of said neighbor outer cell with said backup digital control channel.

\* \* \* \* \*